United States Patent [19]

Datta et al.

[11] Patent Number: 5,106,052
[45] Date of Patent: Apr. 21, 1992

[54] AIR DAMPER APPARATUS

[75] Inventors: Dipti Datta, 1023 McBride Avenue, Mississauga, Ontario, Canada, L5C 1M3; Muammer Yazici, Toronto, Canada

[73] Assignee: Dipti Datta, Mississauga, Canada

[21] Appl. No.: 697,896

[22] Filed: May 9, 1991

[51] Int. Cl.⁵ .............................................. F16K 31/12
[52] U.S. Cl. .......................................... 251/56; 74/57; 74/104; 74/107; 454/333; 251/58; 251/229; 251/251; 251/279; 251/305
[58] Field of Search ...................... 74/25, 57, 104, 107; 98/41.1; 251/58, 229, 251, 252, 279, 305, 56, 228

[56] References Cited

U.S. PATENT DOCUMENTS

| | | | |
|---|---|---|---|
| 3,396,938 | 8/1968 | Matsui | 251/251 |
| 3,696,684 | 10/1972 | Estlick | 251/229 |
| 4,605,198 | 8/1986 | Greiner | 251/58 |
| 4,669,701 | 6/1989 | Tinner | 251/56 |
| 4,858,735 | 8/1989 | Heddle et al. | 251/56 |

Primary Examiner—George L. Walton
Attorney, Agent, or Firm—Baker & Daniels

[57] ABSTRACT

Provided is a damper for controlling air flow through an air duct. The damper includes a mounting fame secured to the interior of the duct which has a circular opening for air flow therethrough when the damper is open. A circular damper plate is provided which is dimensioned to block the circular opening in the closed position while in the fully open position the plate is rotated approximately 90 degrees where it is parallel to the flow direction through the duct. The movement of the damper plate is controlled by an actuator mechanism having a pair of spaced guide plates each of which is provided with two diverging arcuate guide slots. Corresponding guide slots in the two plates are aligned at the same vertical height. A movable support bracket is disposed between the two plates and supports two guide pins which extend horizontally through the aligned slots. The front end of the support bracket is rigidly secured to the damper plate and the back end is secured to a piston shaft coupled to a pneumatic cylinder. The movement of the guide pins in the diverging portion of the guide slots causes the damper plate to rotate while the rate of divergence is sufficient such that when the support bracket is urged forward by the cylinder the guide pins each undergo retrograde motion at different relative positions within the slots. This retrograde motion permits a short piston stroke to be used in addition to increasing the response time of the damper.

23 Claims, 4 Drawing Sheets

AIR DAMPER APPARATUS

FIELD OF THE INVENTION

The present invention relates generally to fluid dampers, and particularly to air dampers used in building ventilation systems.

BACKGROUND OF THE INVENTION

Building air distribution systems require stable and accurately controllable air valve or air dampers for control of building heating and air circulation functions. For maximum efficiency, large numbers of such air dampers are usually computer controlled simultaneously in order to provided the proper heat and air distribution within the building. Air dampers have been disclosed having longitudinal blades provided with sealing gaskets with the blades arranged in a venetian blind arrangement. Such systems are prone to leakage due to alignment problems which can arise over time. Other damper systems employ linkage assemblies having relatively slow response times.

Yet other systems employ piston driven damper plates utilizing a pair of guide pins which slide in an open ended slot and a guide pin slidably mounted in a closed longitudinal guideway wherein in the fully closed position pins are located at the closed ends of the guideway and slot. Systems of this type are disclosed in U.S. Pat. No. 4,605,198 issued Aug. 12, 1986 to Seal-Air Control Systems Inc. A drawback to this kind of arrangement is that backlash problems developing in the damper plate opening and closing mechanism over time will cause the seal formed by the damper plate compressed against a gasket to degrade resulting in leakage. When this damper is opened, the guide pins move translationally along the slots thereby translationally displacing the damper plate until the pin in the open ended slot pivots around the pin located at the end portion of the closed guideway whereupon the damper plate rotates from a vertical to substantially horizontal position. A drawback to this type of movement is that it is very difficult to reproducibly control the motion of the damper plate as it rotates open. Furthermore, it is very difficult to control the position of the damper plate in order to modulate the flow of air through the duct when the plate is not in the fully open or fully closed position. In other words, with this arrangement, there is not a desired linear relationship between the amount of piston movement and the amount of air flow through the system.

It is an object of the present invention to provide an air damper mechanism which permits the same degree of control over a damper throughout its entire movement between the open and closed position.

SUMMARY OF THE INVENTION

According to one aspect of the invention, there is provided a fluid damper for controlling fluid flow. The damper comprises a frame member having an opening for fluid flow therethrough when the damper is open. A closure member is movable between a closed position where the opening is blocked and an open position where the opening is unblocked. An actuator mechanism for controlling the movement of the closure member includes a pair of spaced guide members which are rigidly fixed to the frame member. The guide members are each provided with upper and lower arcuate guide slots with the upper guide slots in the two plates being in registration and the lower slots being in registration. The actuator mechanism includes a bracket having a first registration means mounted in the bracket wherein the first registration means is movably captive within the upper guide slots. A second registration means is mounted in the bracket and is movably captive within the lower guide slots. The closure member is secured to the bracket and a bracket moving mechanism is attached to the bracket for moving the bracket between a first position corresponding to the closure member in the closed position and a second position corresponding to the closure member being in the open position. Movement of the first and second registration means through the diverging guide slots causes the bracket to rotate with respect to the guide members thereby rotationally moving the closure member with respect to the frame member.

According to another aspect of the invention, there is provided a damper apparatus for an air input opening of an air distribution system comprising a closure member having a perimeter portion seatable on the edge of said input opening; means for controlling movement of said closure member, said control means including a pair of spaced guide members each provided with first and second arcuate guide slots the paths of which diverge from one end thereof to the opposite end thereof, means for supporting said closure member connected to said closure member, first and second follower means mounted in or on said supporting means and each provided with followers that are movably captive within the first and second guide slots respectively; and power means for moving said supporting means with respect to said guide members so as to move said closure member between closed and open portions; wherein during use of the apparatus, movement of said followers along said guide slots from positions corresponding to the closed position of the closure member to the open position of the closure member causes said supporting means and closure member to commence and undergo rotation with respect to the guide members as said closure member is moved away from said input opening.

In a preferred aspect of the invention, the diverging portion of the arcuate guide slots is such that at a first intermediate position between the closure member open and closed positions, one registration means or follower means reverses direction and at a second intermediate position the other registration means or follower means reverses direction.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
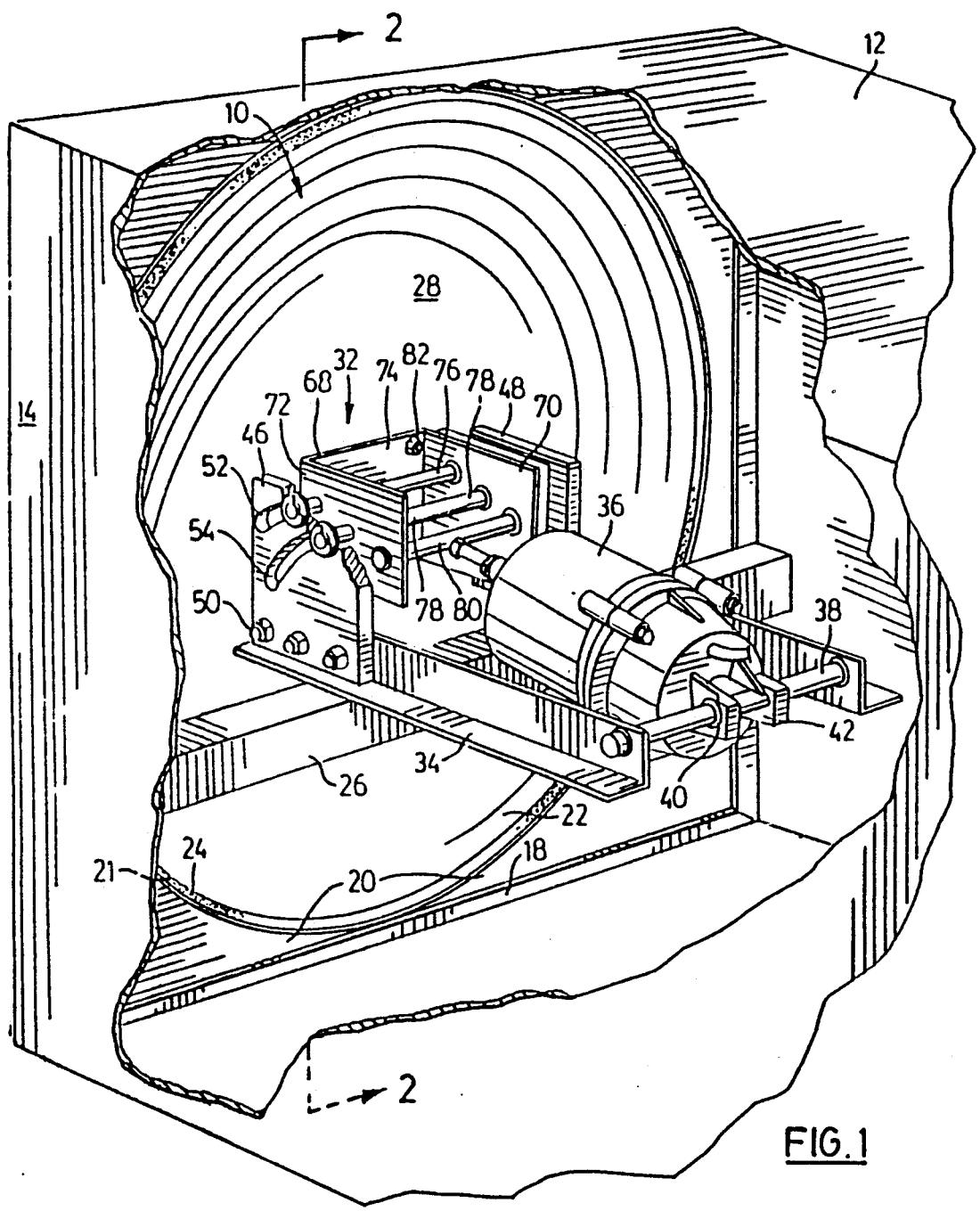
FIG. 1 is a perspective view partly broken away of a fluid damper of the subject invention mounted in an a fluid duct and in the fully closed position.
Figure 2:
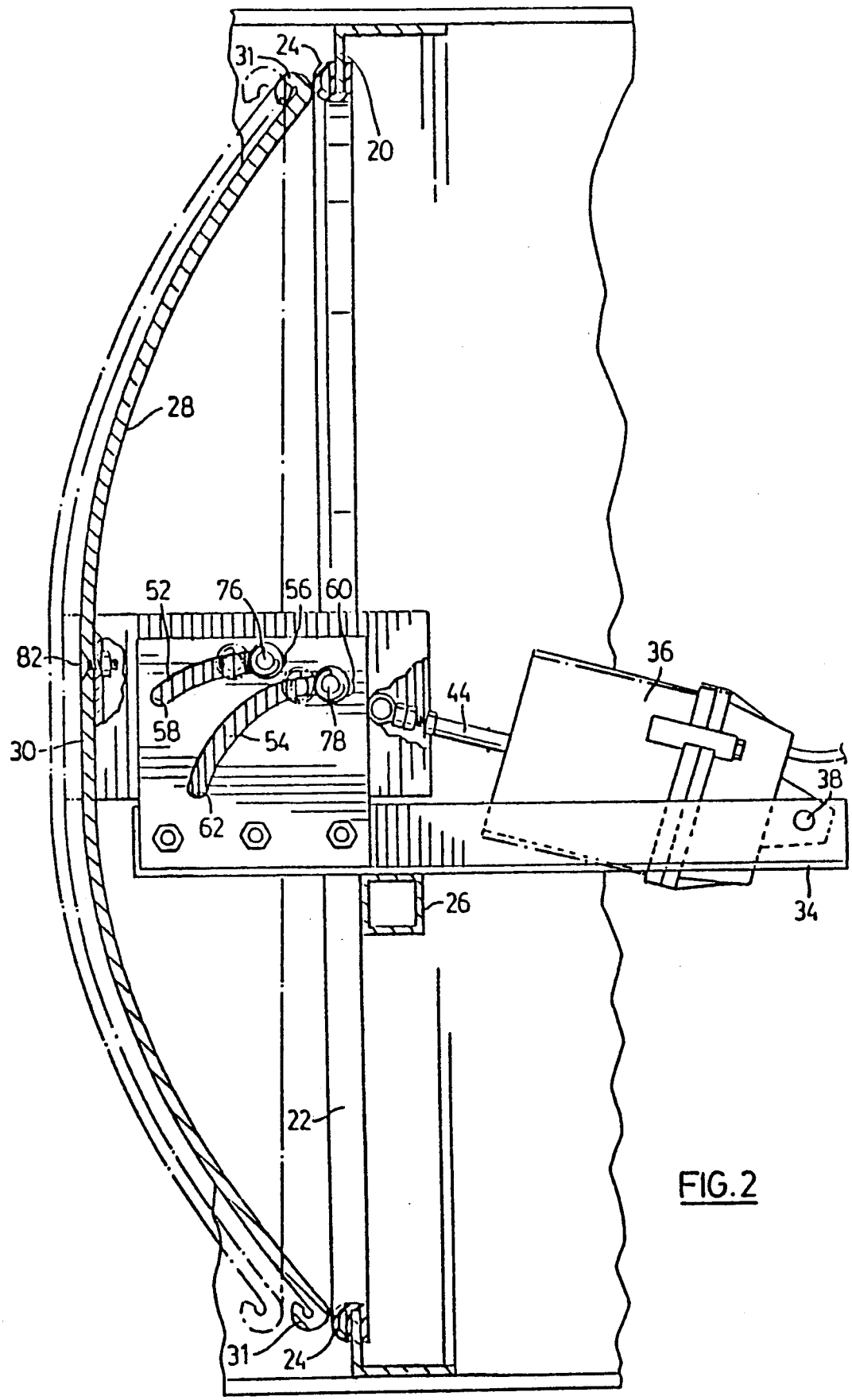
FIG. 2 is a sectional side view of a fluid damper in the fully closed position.

Referring to FIGS. 1 and 2, an air damper 10 is shown mounted within an air duct 12 bounded by walls 14 for controlling air flow therethrough. Fitted in the duct is a rectangular panel 20 with a central circular opening 21. The panel 20 is provided with edge flanges 18 for attachment of the panel to the walls 14 by welding or the use of bolts (not shown). Mounted on or secured to the circular edge of panel 20 is a gasket 24. A support frame 26 extends horizontally across the opening 21 and between the opposite vertical walls 14 of duct 12 at a point lower than the vertical midpoint thereof. The frame 26 can be connected to the panel 20 by means of bolts (not shown).

Damper 10 includes a circular closure member or damper plate 28 which is in the shape of a shallow bowl or dish and which has substantially central flat planar portion 30. Preferably it has a rolled circumferential edge 31 for increased strength and rigidity. In the closed position damper plate 28 is vertically disposed within duct 12 with the peripheral edge of plate 28 in contact with gasket 24 thereby forming an annular seal as represented by the solid lines in FIG. 2. Damper 10 also includes a damper plate actuator mechanism shown generally at 32 for controlling the movement of damper plate 28. Damper 10 includes a pair of spaced mounting frame members 34 secured to support frame 26 on which actuator mechanism 32 is mounted for mounting damper plate 28 in air duct 12.

Actuator mechanism 32 is provided with a pneumatic cylinder 36 pivotally mounted on a pivot rod 38 extending between and secured to frame members 34. The pivotal connection of cylinder 36 to pivot rod 38 is accomplished using a bushing 40 mounted within bracket 42 which in turn is rigidly attached to the back end of cylinder 36. Pneumatic cylinder 36 is provided with a shaft 44 attached to the front end thereof which is held firmly in a colinear relation with cylinder 36 while being reciprocally movable within cylinder 36.

Figure 3:
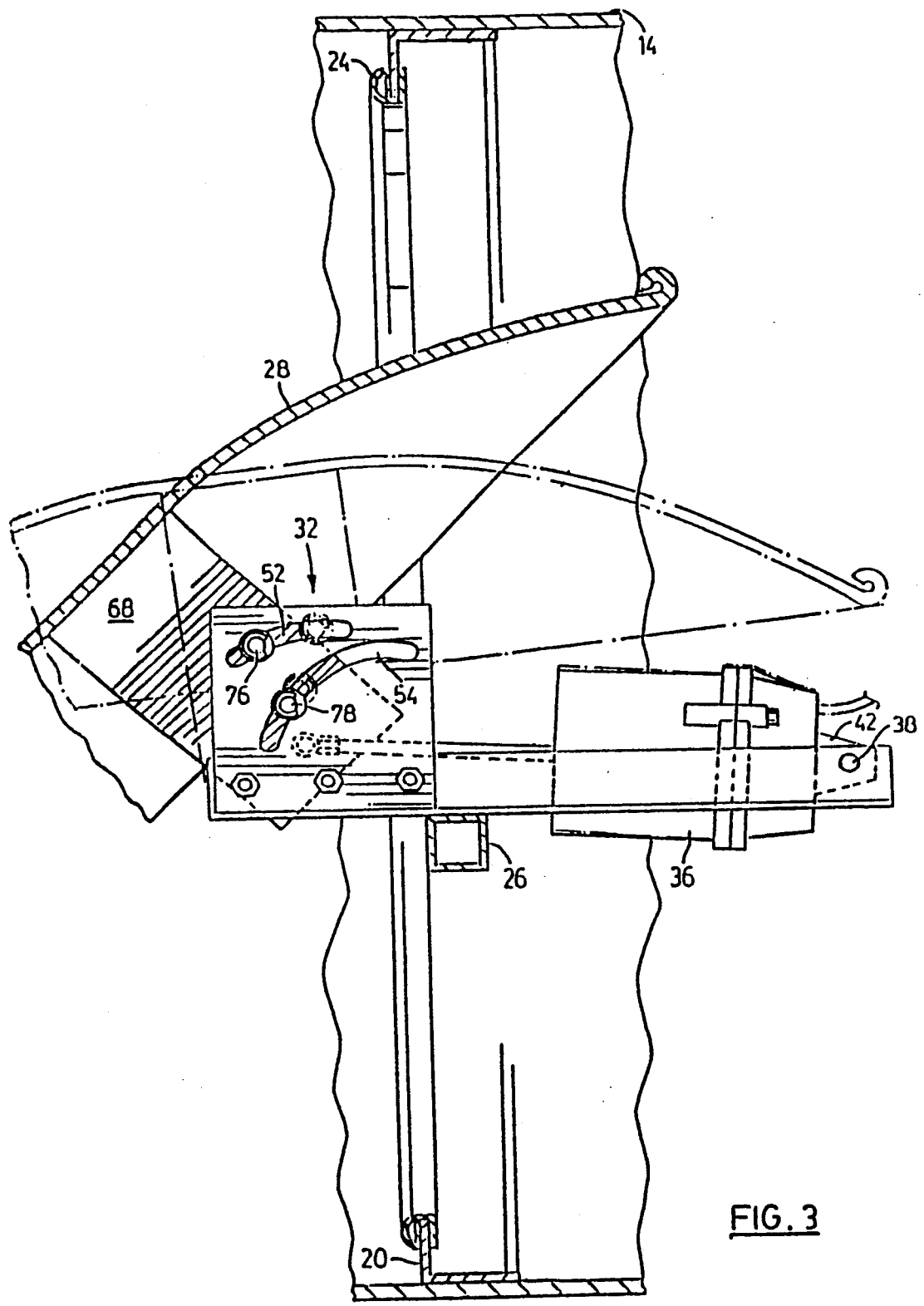
FIG. 3 is a sectional side view partly broken away showing the fluid damper in partially open positions.
Figure 4:
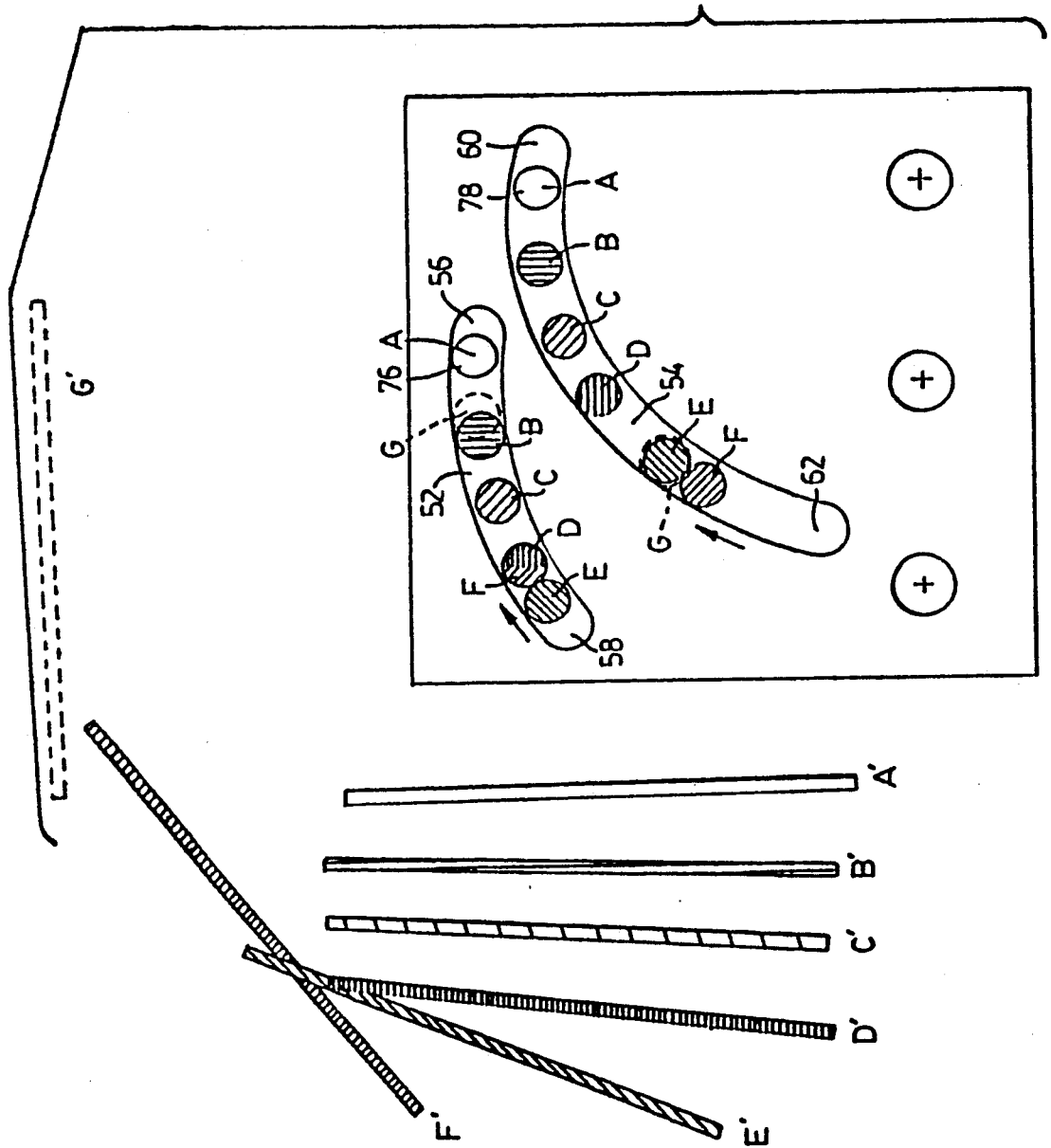
FIG. 4 is a schematic side view of a part of the driver mechanism of a fluid damper of the present invention showing the relative positioning of various parts of the driver mechanism during the opening and closing motions of the damper.

Referring now to FIGS. 2-4, actuator mechanism 32 includes a pair of opposed and spaced outer vertical guide plates or guide members 46 and 48 each rigidly secured to one of mounting frame members 34 by bolts 50 at a position forward of cylinder 36. Guide plates 46 and 48 are each provided with a pair of downwardly arcuate or curvilinear guide slots 52 and 54 which are preferably closed at each end. The first slots 52 are located above second slots 54 in members 46 and 48, in addition first and second slots 52 and 54 are of different lengths with slot 52 being longer than slot 54. Slots 52 in guide plates 46 and 48 are in registration, being horizontally matched. Similarly, the second slots 54 in plates 46 and 48 are in registration. Slots 52 have a back end 56 and a front end 58 while slots 54 have back end 60 and a front end 62. Preferably, the slots 52 and 54 are of uniform width along substantially their entire length. Slots 52 and 54 are each provided with horizontally parallel portions 64 and 66 located adjacent the back end portions 56 and 60 respectively (substantially in the rang between positions A B in FIG. 4) while slots 52 and 54 diverge relative to one another in the forward direction towards the closure member beyond portions 64 and 66.

Actuator mechanism 32 also includes a rectangular U-shaped mounting bracket 68 having side walls 70 and 72 and an end plate 74. This bracket 68 constitutes means for supporting the closure member 28. A pair of spaced and parallel guide pins 76 and 78 are mounted horizontally through walls 70 and 72 and project laterally through slot 52 and 54 respectively and being of a diameter smaller than the width of the slots so that they slide within the slots. These guide pins constitute first and second follower means mounted in or on the bracket 68. A connector bar 80 extends between walls 70 and 72 and is securely mounted therein. The end of cylinder shaft 44 is rigidly attached to connector bar 80. End plate 74 is rigidly coupled to the planar portion 30 of damper plate 28 by a plurality of bolts 82. Alternatively, end plate 74 and damper plate 28 may be coupled using other means such as welding or gluing, depending on the material of construction.

The operation of damper 10 will now be described with reference to FIGS. 2-4. The relative positions of pins or followers 76 and 78 in guide slots 52 and 54 respectively as cylinder 36 urges bracket 68 forwards and backwards is illustrated in FIG. 4 wherein the corresponding positions of damper plate 28 are illustrated. In the closed position, represented by the solid lines in FIG. 2, cylinder 36 and shaft 44 are angled upwardly from the horizontal while plate 28 is sealingly engaged with gasket 24. In the closed position guide pins 76 and 78 are at the rearmost limit of travel in slots 52 and 54 and are spaced from the back end of the respective slots. As cylinder 36 urges the bracket or support means 68 forward, the motion of pins 76 and 78 through the horizontally parallel portions of the slots in the range from A to B results in plate 28 being initially displaced away from plate 20 as indicated by the ghost markings in FIG. 2. Since slots 52 and 54 begin diverging in the latter portion of the region between A and B, guide pin 78 begins dropping relative to pin 76. Since pins 76 and 78 are rigidly mounted through walls 70 and 72, the centre-to-centre (cc) distance between pins 76 and 78 remains constant. Once pin 78 starts dropping with respect to pin 76, bracket 68 and hence damper plate 28 begin rotating upwards. Therefore, as Cylinder 36 urges bracket 68 forward the end of bracket 68 closest to cylinder 36 begins dropping and plate 28 undergoes both translational displacement forward and rotational motion counterclockwise as shown. The various positions of plate 28 are shown in FIG. 4 marked A', B'. . . to the fully open position marked G'. with these positions corresponding to the positions of the pins or followers marked with the same letters. As back end of bracket 68 drops relative to the front end thereof, piston shaft 44 is pulled down causing cylinder 36 to pivot downwards about pivot rod 38. Both pins 76 and 78 undergo forward motion in the respective slots until point E is reached. Beyond points E, the distance between the centre lines of slots 52 and 54 is greater than the centre to centre separation between pins 64 and 66 with the result that both pins can no longer undergo forward motion simultaneously. Consequently, pin 76 in slot 52 is forced to reverse direction with further forward urging of bracket 68 and undergoes retrograde or reverse motion in slot 52. As this occurs, the pin 78 continues to move forward and downwards in slot 54 to point F at which time pin 76 has reached point F in slot 52. Once pin 78 reaches point F it reverses direction and undergoes retrograde motion backwards in slot 54. When pins 76 and 78 reach positions G in their respective slots they stop moving since shaft 44 has reached the end of its forward stroke and damper 10 is in the fully open position, see FIG. 3. When damper plate 28 is in the fully open position, cylinder 36 is approximately horizontal.

The closing of damper 10 will retrace the opening procedure, where now pins 76 and 78 begin moving in the forward direction from points G in the slots until pin 78 reaches point F whereupon it reverses direction in slot 54. Pin 76 continues moving forward until it reaches point F whereupon it reverses direction in slot 52. Both pins are then pulled backwards towards points A in the respective slots. Cylinder 36 pivots upwards about rod 38 until the pins reach the horizontally parallel portions of the respective slots. At this point plate 28 is translationally displaced backwards whereupon the peripheral edge of plate 28 is compressed against gasket 24 thereby sealing damper in the closed position. Due to the fact that in the closed position of the damper pins 76 and 78 are spaced from the front ends of slots 52 and 54, plate 28 will always be compressed against gasket 24 with the same force thereby forming a positive seal. This circumvents the problem of a seal developing leakage over time due to backlash which may arise when the guide pins are designed to be positioned adjacent the slot ends in the closed position.

It will be appreciated that the rate of divergence of slots 52 and 54 determines the length of the piston stroke required to move damper plate 28 from the open to the closed position. Specifically, the greater the divergence of the slots in the forward direction, the shorter the piston stroke required to move the closure member between the two extremes. Since the slots diverge, the pin located in the slot with the steepest slope will move more rapidly than the other pin thereby producing a more rapid opening and closing time than would be obtained for linear slots with the same piston speed.

It will also be understood that while guide slots 52 and 54 are arcuate downwards as disclosed above, they may be arcuate upwards as well. In this case damper plate 28 would be rotated clockwise downwards as viewed in FIG. 2. In addition, the direction of divergence of guide slots 52 and 54 could be reversed and the piston stroke reversed where again the guide slots may be arcuate upwards or downwards as desired.

While the invention as disclosed employs guide slots which diverge at such a rate that both guide pins reverse direction between the damper open and closed position, it will be understood by those skilled in the art that the slots could be designed to diverge at such a rate that only one of the pins undergoes retrograde motion between the open and closed position.

Since the rotational motion of plate 28 occurs for most of the motion of pins 76 and 78 in the arcuate slots, it will be apparent that reproducible and stable control of damper plate 28 in intermediate positions between the fully open and fully closed position is achieved. In other words, a damper constructed in accordance with the invention is very linear in its control, that is, for a certain percentage of piston shaft 44 movement, there is a corresponding percentage of total air flow allowed through the circular input opening 21. For example, a movement by the shaft 44 of one third of its total stroke from the fully retracted position can be made to produce an air flow of about one third the total available air flow.

While the present invention has been described and illustrated with respect to the preferred embodiment, it will be appreciated that numerous variations of these embodiments may be made without departing from the scope of the invention, which is defined in the appended claims. For example, a reversing relay can be introduced between the cylinder 36 and the mounting bracket 68. The closure member 28 is then in the open position when the piston shaft 44 of the cylinder is fully retracted. The closure member 28 then starts to close as the shaft 44 is extended.

I claim:

1. A damper for controlling fluid flow in a fluid duct, comprising:
   a) a frame member having an opening for fluid flow therethrough when the damper is open;
   b) a closure member movable between a closed position where the opening is blocked, and a second position in which the opening is unblocked;
   c) a mechanism for controlling movement of said closure member and causing said closure member to undergo an initial translational movement away from said frame member and then a rotational movement relative to said frame member, the mechanism including a pair of spaced, flat guide plates fixed to the frame member, the guide plates being parallel and each provided with first and second arcuate guide slots, the first guide slots diverging from the second guide slots along a substantial portion of their length, the first guide slots in the two guide plates being in registration with one another along their lengths, the second guide slots in the two guide plates being in registration with one another along their lengths, support means having a first and second registration means in the form of guide pins fixed thereto, said first and second registration means being spaced apart a fixed distance at all times, the first registration means movably captive within the first guide slots and the second registration means movably captive within the second guide slots, the closure member secured to the support means, means for moving the support means between a first and second position, the first position corresponding to the closure member being in the closed position and the second position corresponding to the closure member being in the open position, wherein movement of the first and second registration means through the diverging guide slots causes the support means and closure member to undergo said initial translational movement and then to rotate with respect to the guide plates thereby rotationally moving the closure member with respect to the frame member.

2. The damper according to claim 1 wherein the divergence of the diverging portions of the slots is such that at a first intermediate position between the bracket first and second positions one registration means reverses direction.

3. The damper according to claim 2 wherein the divergence of the diverging portions of the slots is such that at a second intermediate position between the open and closed position the other registration means reverses direction.

4. The damper according to claim 1 wherein the divergence of the diverging portions of the slots is such that at a first intermediate position between the bracket first and second positions one registration means reverses direction and at a second intermediate position between the open and closed position the other registration means reverses direction.

5. The damper according to claim 1 wherein in the support means first position the registration means are located at a position in the guide slots spaced from the back end of the guide slot, and wherein at the farthest point of travel in the forward direction of the registration means in the guide slots in the forward direction the registration means are spaced from the front end of the guide slots.

6. The damper according to claim 1 wherein the first and second slots each have portions adjacent the back ends of the slots having a divergence such that when the first and second registration means move through said portions the support means moves substantially translationally with respect to the bracket.

7. The damper according to claim 6 wherein said portions adjacent the back ends of the slots are short with respect to the length of the respective slots.

8. The damper according to claim 1 wherein the slots are arcuate downwards.

9. The damper according to claim 8 wherein the slots diverge from the back end of the guide plates to the front of the guide plates.

10. The damper according to claim 8 wherein the slots diverge from the front of the guide plates to the back of the guide plate.

11. The damper according to claim 1 wherein the slots are arcuate upwards.

12. The damper according to claim 11 wherein the slots diverge from the back of the guide plates to the front of the guide plates.

13. The damper according to claim 11 wherein the slots diverge from the front of the guide plates to the back of the guide plates.

14. The damper according to claim 1 wherein the support moving means is a pneumatic cylinder, the cylinder pivotally coupled to the frame member.

15. The damper according to claim 1 wherein the support means is a bracket located between the guide plates.

16. A damper apparatus for an air input opening of an air distribution system comprising:
(a) a closure member having a perimeter portion sealably seatable on the edge of said input opening;
(b) means for controlling movement of said closure member and causing said closure member to undergo an initial translational movement away from the edge of said input opening and then a rotational movement relative to said edge of the opening, said control means including a pair of spaced, flat guide plates each provided with first and second arcuate guide slots the paths of which diverge from one end thereof to the opposite end thereof, means for supporting said closure member connected to said closure member, first and second follower means mounted in or on said supporting means and each provided with followers that are movably captive within the first and second guide slots respectively, the followers being spaced apart a fixed distance at all times, the first guide slot of one guide plate being parallel to the first guide slot on the other guide plate and in registration therewith, the second guide slot of one guide plate being parallel to the second guide slot of the other guide plate and in registration therewith; and
(c) means for moving said supporting means with respect to said guide plates so as to move said closure member between closed and open position, wherein during use of the apparatus, movement of said followers along said guide slots from positions corresponding to the closed position of the closure member to the open position of the closure member causes said supporting means and closure member to commence and undergo said initial translational movement and then rotation with respect to the guide members as said closure member is moved away from said input opening.

17. A damper apparatus according to claim 16 wherein the divergence of the slots is such that during movement of said closure member between said closed and open positions the followers of one of said first and second follower means reverse their direction of movement along their respective slots.

18. A damper apparatus according to claim 17 wherein the divergence of the slots is such that during movement of said closure member between said closed and open positions, the followers of the other of said first and second follower means reverse their direction of movement along their respective slots.

19. A damper apparatus according to claim 16 wherein said closure member is circular dish shaped so as to close a circular input opening.

20. A damper apparatus according to claim 16 wherein both of said first and second guide slots are smoothly and continuously curved from one end thereof to the opposite end thereof and both are curved in the same general direction.

21. A damper apparatus according to claim 16 wherein both of said first and second guide slots are smoothly and continuously curved from one end thereof to the opposite end thereof and they diverge in the forward direction towards said closure member.

22. A damper apparatus according to claim 16 wherein both of said first and second guide slots are closed at both ends thereof.

23. A damper apparatus according to claim 16 wherein both of said first and second slots are closed at both ends thereof and are of uniform width along substantially their entire length.

* * * * *